United States Patent [19]

Hellerman

[11] Patent Number: 4,961,401
[45] Date of Patent: Oct. 9, 1990

[54] MANGER DIVIDER
[76] Inventor: John E. Hellerman, R.R. 2, Box 88, Melrose, Minn. 56352
[21] Appl. No.: 332,342
[22] Filed: Apr. 3, 1989
[51] Int. Cl.$^5$ ................................................ A01 5/01
[52] U.S. Cl. .......................................... 119/61; 119/27
[58] Field of Search ................... 119/61, 63, 27, 82, 119/147 R

[56] References Cited

U.S. PATENT DOCUMENTS

| | | | |
|---|---|---|---|
| 1,018,611 | 2/1912 | Glor | 119/61 |
| 1,053,031 | 2/1913 | Harris | 119/61 |
| 1,084,934 | 1/1914 | Ferris | 119/61 |
| 1,095,148 | 4/1914 | Ferris | 119/61 |
| 1,121,176 | 12/1914 | Ferris | 119/61 |
| 1,187,783 | 6/1916 | Rassmann | 119/61 |
| 1,261,214 | 4/1918 | Clay | 119/61 |
| 2,309,896 | 2/1943 | Gustafson | 119/61 |

FOREIGN PATENT DOCUMENTS 362568 7/1962 Switzerland ........................ 119/61

Primary Examiner—John Weiss
Attorney, Agent, or Firm—Warren A. Sturm

[57] ABSTRACT

A portable manger divider that is easily attached to, and removed from, a stall frame and stanchion for livestock which includes a flat rectangular divider provided with upper and lower mounting means which abut to, and engage, a vertical member and are maintained in engagement by a mounting means disposed intermediate the upper and lower mounting means. A horizontally extending member which engages adjacenty disposed vertical portions of the stanchion and/or stall member may extend across horizontally spaced apart stanchion or stall members.

9 Claims, 2 Drawing Sheets

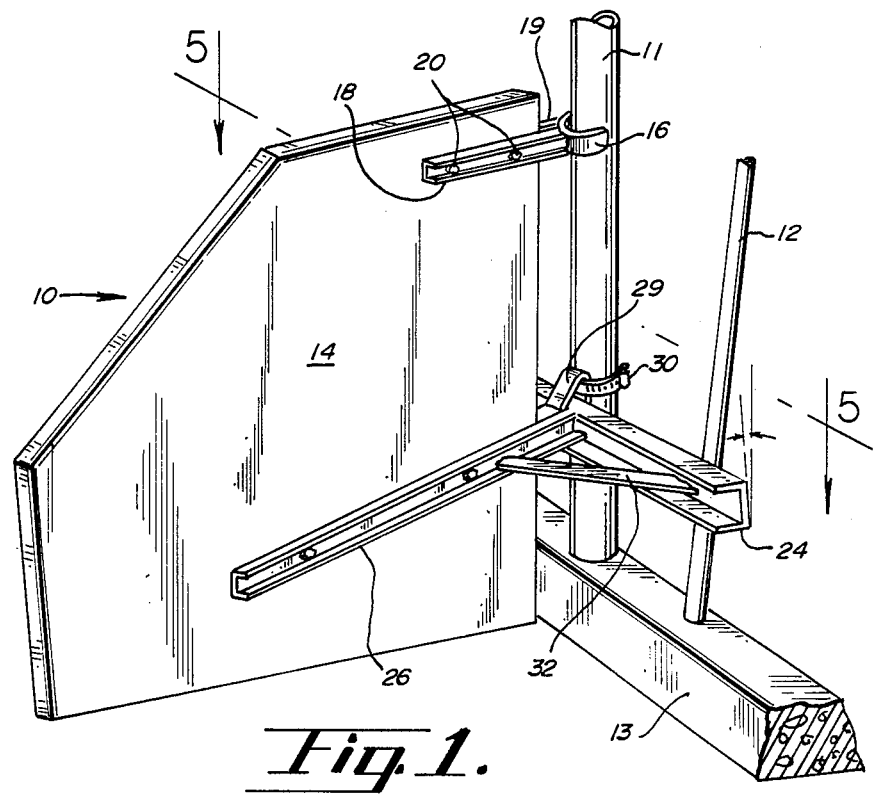
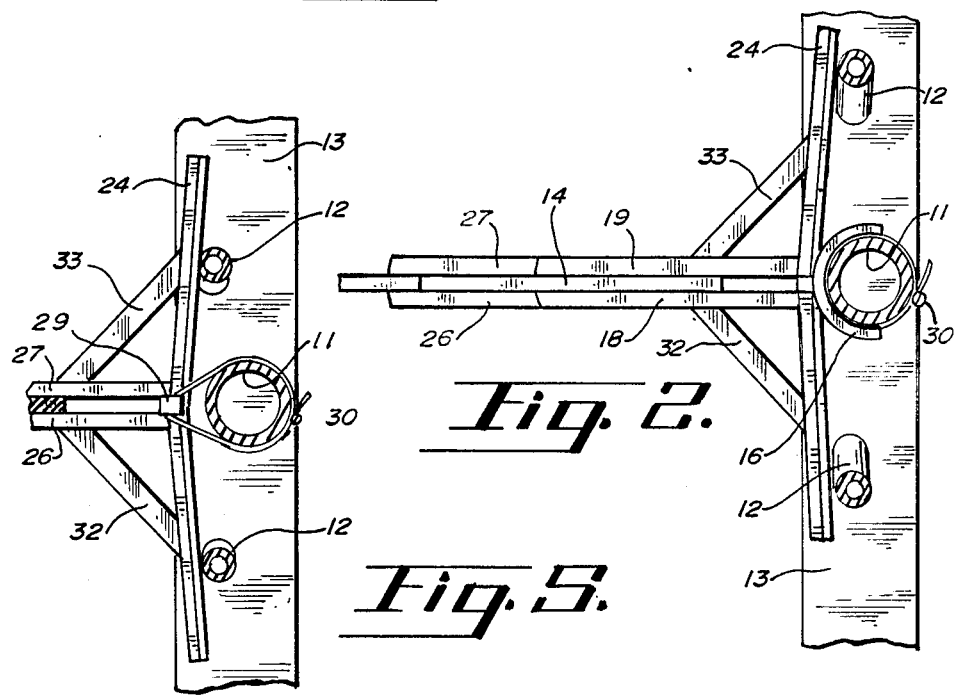

MANGER DIVIDER

BACKGROUND OF THE INVENTION

1. Field of the Invention

My invention relates generally to animal feed trough dividers and is more particularly directed to a manger divider for preventing an animal from eating feed intended for other animals feeding in adjacent stalls in a feeding area.

2. Description of the Prior Art.

Traditionally dairy cows have been fed in long, u-shaped feed troughs generally extending the length of the barn or animal housing area and located directly in front of and perpendicular to the stanchions in which the cows are secured for feeding. milking, etc. Therefore, the feed troughs extend from one cow's stanchion to the adjacent cow's areas and so forth down the row of cows without any delineation as to the end of one cow's feeding area and the beginning of the next cow's feeding area. The farmer distributes food such as roughage, silage, feed supplement or the like in the trough dispersing the food between the cows manually as the farmer progresses along the length of the feed trough. Each cow receives approximately the same amount of feed with this method. Once an individual cow has been secured in a particular stanchion, the range of motion of the cow's head is vertically and horizontally limited, thereby also limiting access to feed in the feed trough to only that area of the feed trough which the cow can reach. Even with that limitation, cows will generally stretch to reach the outer limits of their range to access additional feed. Due to the close proximity of the stalls and stanchions of one dairy cow to adjacent dairy cows while secured in their stanchions, there is frequently an effective overlap of one cow's feeding area with the next cow's feeding area. This can be a problem if the feed of a particular cow is a special mix, contains medicine or is specially adapted to a particular animal for any reason. Therefore, the capability of individualizing the feeding of each cow has distinct advantages. The advent of computerized milking and feeding operations, in which an individual cow's feed ration is allotted relative to that cow's milk production, has amplified the need for a reliable, simple to install inexpensive. lightweight, easily cleanable manger divider which can separate the single communal feed troughs found in most barns into smaller, individual trough areas.

Other patents have disclosed various mounting brackets and devices and are listed herewith:

| U.S. Letters Pat. No. | Inventor |
| --- | --- |
| 567,116 | Bailey |
| 2,727,712 | Holmboe |
| 3,143,331 | Corey |
| 3,568,797 | Hardy |
| 3,776,498 | Peters et al |
| 4,219,285 | Hayashi |
| 4,341,029 | Heard |

However, none of the above-mentioned patents disclose a manger divider similar to the present invention.

SUMMARY OF THE INVENTION

According to the present invention, there is provided a device for dividing the mangers of dairy cows comprising a divider member maintained in position by upper and lower mounting, or attachment means. The upper mounting means braces the divider member against a vertical stall frame member. The lower mounting or attachment means releasably connects the divider member to the vertical stall frame member and maintains the divider member in an upright, parallel position to the stall frame member. The lower mounting means further includes a horizontal stabilizer bar extending perpendicular to the divider member into laterally spaced adjacent stanchion members thereby holding the dIvIder member securely in place.

BRIEF DESCRIPTION OF THE DRAWINGS

FIG. 1 is a perspective sketch of the device of my invention illustrating the device in position after attachment to a vertical stall frame member and stanchion on a feed trough;

FIG. 2 is a top view of the device of the present invention;

FIG. 5 is a sectional view taken along section line 5—5 on FIG. 4 of the drawings.

DETAILED DESCRIPTION OF THE PREFERRED EMBODIMENT

Figure 3:
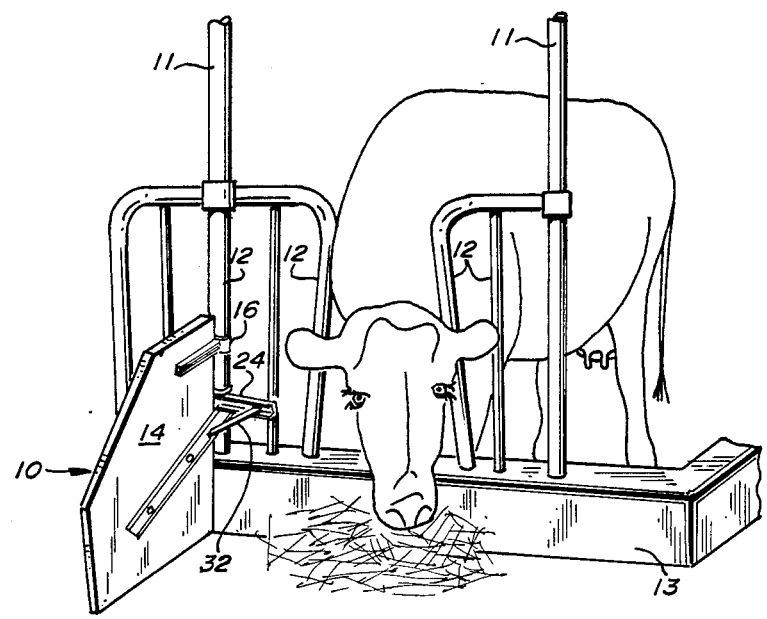
FIG. 3 is a sketch of an animal feeding station showing my invention employed as a divider between adjacent animal feed stations in an agricultural environment.
Figure 4:
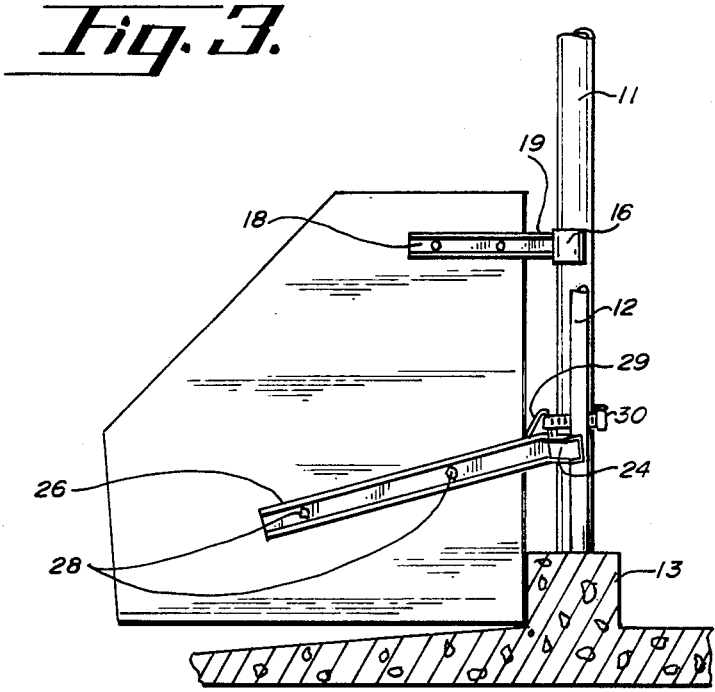
FIG. 4 is a side elevational view showing my manger divider installed on a stanchion and support frame on a feed trough.

Referring to the drawings, in which like elements have been identified with like reference characters, my manger divider is identified generally by reference character 10 and includes generally rectangular divider member 14 which includes upper and lower mounting brackets that are adapted to coact with the vertical portions of a stall frame 11 and stanchions 12 to removably, stationarily dispose divider member 14 intermediate adjacent feed stalls disposed along a curb 13 in an agricultural feed trough environment. Divider member 14 may be comprised of a rigid panel of metal, plastic, wood or the like.

In such an environment, for example a dairy building, a plurality of spaced apart stanchions for receiving the heads of cows are provided with and include vertically extending upright stall frame members, each connected to one or more vertically extending, laterally spaced apart stanchion members which culminate in a vertically extending slot, therebetween, at the center of a feed stall. Each of such feed stalls are comprised of adjacently disposed, upwardly extending stall frame members and associated, laterally spaced apart, stanchion members and it is desired to dispose a manger divider intermediate each of such stalls as are normally occupied by an animal during a feeding period. Therefore, except for the feeding stall defined at each end of a row of stalls disposed laterally along the length of a feed trough including a curb 18, a manger divider may be disposed at each vertical stall frame member intermediate adjacent feed stalls.

As will be understood by a consideration of the following description, my manger divider is securely, rigidly, removably, stationarily disposed between individual feed stalls by a multipoint attachment arrangement including upper and lower mounting brackets that are adapted to engage and coact with the vertical frame and stanchion member that serve to define each side of an animal feeding station. At each location along the length of a feed trough at which it is desired to confine the feed in a particular stall, m divider may be easily installed or removed through the actuation of a single clamping means operable therewith.

As may be seen from a concurrent consideration of the drawings, my mange divider 10 is shown having an upper bracket means including a semi-circular member 16 that is configured to have a radius substantially the same or greater than the radius of vertical stall frame member 11 and is rigidly attached, as by welding, to the ends of mounting members 18 and 19 disposed on either side of and attached to divider member 14 near its upper forward corner through the use of suitable screw threaded fastening means 20. A lower bracket comprised of a laterally horizontally extending, slightly bow shaped stabilizer member 24 is shown disposed at a slight angle with respect to the vertical axis of vertical stall frame member 11 and stanchion members 12 and is connected at its center portion to a pair of mounting members 26 and 27, disposed on either side of the lower front portion of divider member 14 and attached thereto through suitable screw-threaded fastening means, 28. Laterally extending stabilizer member 24 is further rigidly attached to mounting members 26 and 27 through diagonally extending side support members 32 and 33, attached at either end, as shown, through suitable means, such as welding or the like. A suspension and clamping hook 29 is shown extending upwardly and rearwardly of laterally extending bracket 24 and is suitably dimensioned to receive a suitable clamping means, 30, for purposes to be explained below. As may be seen in FIG. 6, when manger divider 10 is disposed adjacent to vertical stall frame member 11 and the laterally disposed stanchion members 12, the center of laterally extending bracket 24 is spaced a considerable distance from vertical stall frame member 11 and the ends thereof are disposed adjacent to and in engagement. With stanchion members 12. When clamping means 80, shown in the form of a stainless steel hose clamping band of the type commonly found in automobiles and the like is tightened, the center of horizontal stabilizer bar will be spaced apart from vertical stall frame member 11 and the manger divider will be rigidly, removably, stationarily disposed in its operative position and, because of the spring action obtained by the slightly bowed configuration of laterally extending bracket 24, the usual attempts at removal by the animal will be resisted and the desired integrity of the stall will be maintained. When it is desired to remove the manger divider, the mounting means 30 is disassembled and removed and the manger divider transported to a new location.

I claim:

1. A portable manger divider easily attachable to a livestock stall frame and stanchion comprising:
   a stall frame and stanchion including a vertical stall frame member;
   a flat substantially rectangular divider member;
   an upper mounting means, on said divider member, disposed on said vertical stall frame member;
   lower mounting means on said divider member, disposed adjacent to and connected to said vertical stall frame member intermediate said lower and upper mounting means for maintaining the divider member in an upright, parallel position to the stall frame member, said lower mounting means including a horizontal stabilizer bar extending perpendicularly to the divider member and in abutment with horizontally, spaced apart stanchion members at each end whereby the divider member is securely held in position on the stall frame and stanchion intermediate adjacent livestock stalls.

2. The manger divider claimed in claim 1 in which the divider member is comprised of plastic.

3. The manger divider claimed in claim 1 in which the divider member is comprised of metal.

4. The manger divider of claim 1 in which the divider member is comprised of wood.

5. The manger divider of claim 1 in which the upper mounting means includes a semi-circular member dimensioned to engage the stall frame member so as to prevent lateral horizontal displacement.

6. The manger divider of claim 1 in which the lower mounting means includes an upwardly, rearwardly extending hook and a removeable connecting means extending around the vertical stall frame member and said hook 7. The manger divider of claim 6 in which the center of the horizontal stabilizer bar is horizontally spaced apart from the vertical stall frame member.

8. The manger divider of claim in which the horizontal stabilizer bar has a flat front surface inclined at a slight angle from the vertical stall member.

9. The manger divider of claim 7 in which the horizontal stabilizer bar has a flat front surface inclined at a slight angle from the vertical stall member.

* * * * *